M. G. KELLOGG.
MULTIPLE SWITCHBOARD.
No. 11,386. Reissued Nov. 14, 1893.
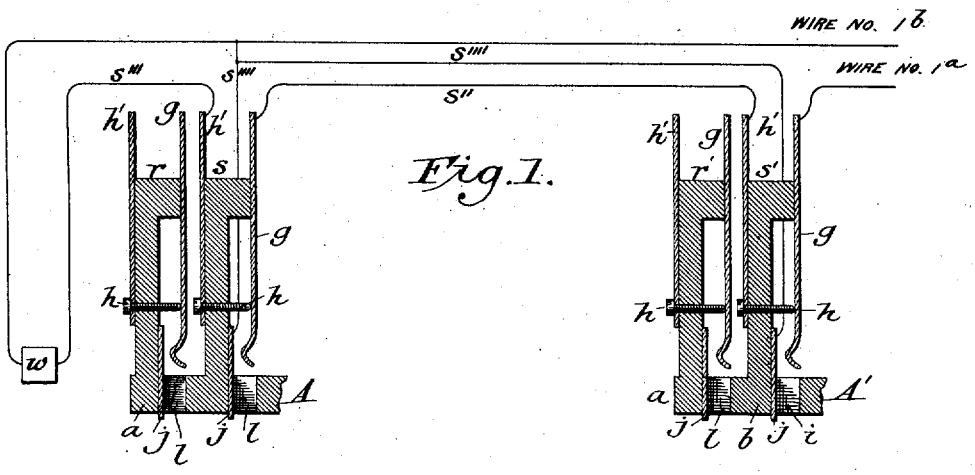
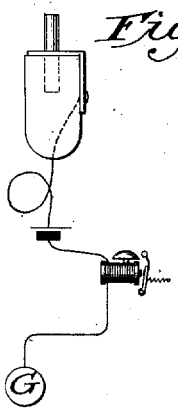
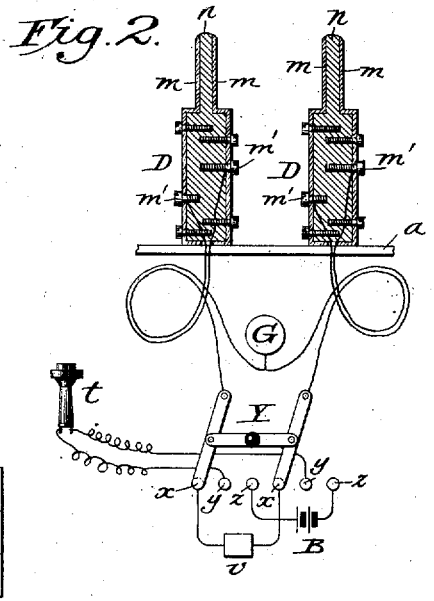
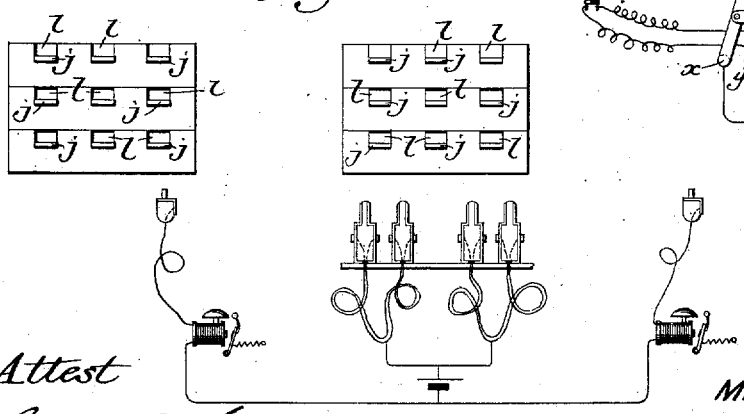
Attest
Sidney F. Hollingsworth
Battis & Long.
Inventor
MILO G. KELLOGG
by his attorneys
Baldwin, Davidson & Wright
THE NORRIS PETERS CO., PHOTO-LITHO., WASHINGTON, D. C.

UNITED STATES PATENT OFFICE.

MILO G. KELLOGG, OF CHICAGO, ILLINOIS.

MULTIPLE SWITCHBOARD.

SPECIFICATION forming part of Reissued Letters Patent No. 11,386, dated November 14, 1893.

Original No. 382,477, dated May 8, 1888. Application for reissue filed December 3, 1890. Serial No. 373,373.

*To all whom it may concern:*

Be it known that I, MILO G. KELLOGG, of Chicago, Illinois, have invented certain new and useful Improvements in Multiple Switchboards for Telephone-Exchanges, of which the following is a full, clear, and exact description, reference being had to the accompanying drawings, forming a part of this specification.

My invention relates to a metallic circuit telephone exchange system—more especially to such a system in which the lines are not grounded at the subscribers' stations, and are not normally grounded at the central office—and an organization for testing at any of the boards to determine whether a line is in use at another board.

The invention consists, generally stated, in the combination with metallic circuit lines and suitable switch devices of an operator's test circuit or connection and suitable test devices, by which when two lines are switched for conversation the test connection or circuit may be completed by connection with either line and the test instrument or device will indicate that the line is in use, all as hereinafter described and claimed.

In the accompanying drawings, illustrating my invention: Figure 1 is a diagram illustrating the main-line apparatus and a metallic circuit that is normally disconnected from the ground. Fig. 2 shows a diagram of the operator's cord system for receiving and answering calls, switching, and clearing out subscribers' lines. Fig. 3 shows an operator's test system including a test plug, battery, bell, and connections. Fig. 4 shows a modification of the apparatus and system.

In Fig. 1, A is a sectional view of one switchboard, and A′ is a sectional view of another switch-board to which the same lines are connected. I place as many boards in the office as are found necessary or desirable, in order to properly answer the calls and make the connections. On each board is a spring-jack or other suitable switch for each line. Each spring-jack has a contact spring which normally bears on an insulated contact-point and has a contact-piece insulated from the rest of the switch, (except by line connections,) and is adapted to receive a loop switch-plug, and when the plug is inserted to disconnect the spring from the contact-point (on which it normally rests) and connect the contact-pieces of the plug with the spring, and the contact-piece, respectively. In the figure *g*, *g* represent the springs of the different switches; *h*, *h*, the contact-points, and *j*, *j* the contact-pieces. The plugs D, D, (shown in Fig. 2) when inserted into the switches, operate them as above described. The contact-pieces should be so placed that a test-plug or other switch-testing device may be readily connected with them. The subscriber's circuit shown in the drawings begins say, at the central office, and passes by a wire, which we will call "wire No. $1^a$," to the subscriber's station, through the station apparatus, and back to the central office by another wire, which we will call "wire No. $1^b$." One of the wires—say wire No. $1^b$—is connected to all the contact-pieces above mentioned of its switches on the different boards. The other wire passes successively through the contact-points formed by the spring-levers and their corresponding points of its switches on the different boards, passing in each case to the spring first. It is then connected to wire No. $1^b$. If an annunciator is used to receive the calls of the line, it is preferable to place it in the circuit of the line after it has passed through the contact-points, as above, and before it passes from there to the contact-pieces. This line is not connected with the ground at the subscribers' stations or normally elsewhere; but is connected with the ground at the central office when switched for conversation, as and for the purpose which will hereinafter appear.

Fig. 2 shows a pair of loop switch-plugs with flexible loop cords adapted to fit into the spring-jack switches and make the switching-connections for two lines which are to be connected together for conversation. One of the conductors of the cord is grounded by a branch wire, as shown. It is evident that when one of the plugs is placed in the spring-jack switch of one line and the other plug is placed in the spring-jack switch of another line the two lines are connected together in metallic circuit and the circuit is grounded at the central office.

Fig. 3 shows a test-circuit with apparatus for use by an operator at any board. The circuit shown in this figure consists, essentially, of a wire with a signal-bell and battery in its circuit, grounded at one end and terminating at the other end in a flexible cord with a plug adapted to be brought into contact with any of the contact-pieces *j*, *j* at the board.

Each operator should have at her board a system of pairs of cords with their plugs, with the necessary switches, telephone, and generator, suitably placed and connected so as to properly conduct the business assigned to her. In Fig. 2 only one pair of cords is shown. Others could be added to her system in ways evident to those skilled in the art. She should also have at her board a test system similar to that described above. For the test-receiving instrument she might use a telephone or other suitable apparatus in the place of the bell which is shown. In this figure *m*, *m'* are the contact-pieces of the plugs, *n*, *n* the insulating material of the plugs, Y the operator's switch, *t* the telephone, B the generator, V the clearing out annunciator, and *x*, *x*, *y*, *y*, *z*, *z*, are the contacts of the switch Y. *a* is a metallic plate on which the plugs D normally rest and with which the contact-pieces of the plugs are in contact, so that when a subscriber has called and the operator has inserted one of the plugs in the switch of the calling line a circuit is afforded in which the operator's telephone may be included by manipulating the switch Y. This circuit is from one contact of the inserted plug with which one side of the line is connected to a contact of the other plug of the pair, thence by plate *a* and other contact of said plug to the switch Y and remaining contact of the inserted plug with which the other side of the line is connected.

When an operator at any board desires to test a line to see whether it is in use at another board, she connects her test-plug to the contact-piece *j* at her board of the line to be tested, and if the line is in use there will be a complete circuit through her test-bell and the battery, and the bell will respond and she will know that the line is already in use. In Figs. 1, 2 and 3 the circuit can be traced as follows: Beginning with the ground, thence through the test-bell and battery to the test-plug, and thence through the contact-piece, and the line back to the ground (to which the line is temporarily connected while switched for conversation). If, however, the line is not switched for use, there will be no such complete circuit when the test is made, because the line is disconnected from the ground, and the test-bell will not respond. It is, however, not a necessity in my system that the lines should be grounded when they are switched for conversation, if the apparatus and connections are modified accordingly. The lines, when switched, may be connected to a common metallic test circuit or wire, to which are also connected the test-circuits at the different boards. In the modification shown in Fig. 4 the connections are thus made. It is, however, convenient to use the ground as a part of the test-circuit and I have therefore herein described its use.

It is known not to be detrimental to the working of a metallic-circuit telephone exchange to have the metallic circuits grounded at the central office while they are used for conversation, provided they are not then grounded elsewhere, or to have the circuits joined together at one point in each, provided they are not looped together. For these reasons my test system will not affect the successful working of the metallic circuit system.

The test battery may be placed in the common ground wire or in a common test-wire, to which the lines are connected when switched for conversation, instead of there being one in the test-circuit of each board after it branches from the ground or the common test-wire. In Fig. 4 the test-battery is shown placed in the common test-wire. Where either of the plans last suggested is adopted, if the metallic circuit lines were normally to ground, there would be no circuit from any line through the test battery and test devices to the test plug or switch device until the lines are switched for conversation when, as described, they will be connected with one side of the test circuit or connection. My invention therefore comprehends a test circuit, including proper devices, that is completed on one side when the lines are switched for conversation, and is on the other side adapted to be brought into connection for testing with either of the switched lines.

I claim as my invention and desire to secure by Letters Patent—

1. In a telephone-exchange system, two metallic circuit telephone-lines normally disconnected from the ground and temporarily connected together for conversation, with their circuit grounded, in combination with a test-bell grounded on one side and connected on its other side to a switch-testing device, adapted to be brought into connection with either line for testing, and a battery, in the test circuit between the ground-connection on one side of the bell and the temporary ground-connection of the two lines, substantially as and for the purpose set forth.

2. In a telephone-exchange system, two metallic-circuit telephone-lines normally disconnected from the ground and temporarily connected together for conversation with their circuit grounded, in combination with a test-wire grounded on one side and connected on its other side to a switch-testing device, adapted to be brought into connection with either line for testing, and a battery and test-bell in the circuit of said test-wire, substantially as and for the purpose set forth.

3. In a telephone-exchange system, the combination of two metallic-circuit lines temporarily connected together for conversation, a test-circuit containing a test-receiving instrument and a test-battery, said test-circuit being electrically connected on one side of said instrument and battery with said lines when they are thus connected for conversation, and then only, a test-bolt connected to each of said metallic-circuits, and a switching device connected to said test-circuit on the other side of said instrument and battery, adapted at the will of the operator to be brought into electrical connection with either of said test-bolts, substantially as and for the purpose set forth.

4. In a telephone-exchange system, metallic circuit lines normally dis-connected from the ground, two or more switch boards, to each of which the lines are connected, and switching devices at each board adapted to temporarily connect any two of the lines together for conversation, and when they are thus connected to ground their circuit, in combination with test-receiving instruments, one at each board, grounded on one side, switch-testing devices at each board adapted at the will of the operator to connect its test-receiving instrument on the other side to the circuit of any line for testing, and a battery in the test-circuit thus established, substantially as and for the purpose set forth.

5. In a telephone exchange system, the combination of metallic-circuit lines, two or more switch-boards for said lines, test circuits, one at each board, each test-circuit containing a test-receiving instrument and a test battery, said test-circuits being electrically connected on one side to their test-receiving instruments and test-batteries, and normally disconnected from said lines, switching-devices at each board adapted to connect any two of said lines together for conversation and to connect them temporarily or when thus connected electrically with said test-circuits on said side of their test receiving instruments and battery or batteries, test-bolts, one for each line on each board, each test-bolt being connected to its line when it is switched for conversation, and switch-testing devices at each board, each connected to the test-circuit at its board on the other side of the test-receiving instrument and battery, and adapted at the will of the operator to be brought into electrical connection with any of the test-bolts at her board, substantially as and for the purpose set forth.

6. In a telephone exchange system, two metallic circuit lines each normally disconnected from one side of a test battery, in combination with switch apparatus by which when the lines are switched together into metallic circuit for conversation their circuits are connected to such side of said battery a test plug or device connected to the other side of said battery and adapted to be brought for testing into connection with either line, and a test receiving instrument in the test circuit thereby established, substantially as set forth.

7. In a telephone exchange system, two metallic circuit lines each normally disconnected from one side of a test circuit or connection which includes a test battery and test receiving instrument, and connected with such side of said circuit while or as long as switched together in metallic circuit for conversation, in combination with a test plug or device connected to the other side of said test circuit or connection and adapted to be brought for testing into connection with either of said lines, substantially as set forth.

8. In a telephone exchange system, the combination with two subscribers' metallic circuit lines temporarily connected together in metallic circuit for conversation, of a test circuit of which the ground forms a part or connection and with one side of which said lines are then connected, the other side of said test circuit being adapted to be brought into connection with either of said lines, substantially as described.

9. In a telephone exchange multiple switch board system, metallic circuit lines, a test terminal for each line on each board adapted to form connection with a contact of a switch plug when a plug is inserted into the line switch for switching at its board, a circuit connection for each line to which said test terminals of the line are permanently connected, test battery connected on one side to said contact piece of the plug through a flexible conductor, while or as long as the plug is in the switch, a test receiving instrument at each board connected on one side to a test plug or device adapted to be brought for testing into connection with each of said terminals at its board, and on its other side to the other side of said test battery, whenever the line is tested and is then switched and connected in closed circuit for conversation.

10. In a telephone exchange, multiple switch boards and telephone lines, each permanently connected to a test terminal on each of said boards, in combination with test battery connected on one side to a line whenever and as long as the line is switched and connected in closed circuit for conversation, but disconnected on its other side from the line except when a test plug is connected to the line for testing and test receiving instruments, one at each board, each connected on one side to the other side of said test battery whenever a line is tested and is thus switched for conversation, and on the other side to a test plug or device adapted to be brought into connection with said test terminal at its board, substantially as set forth.

11. In a telephone exchange, multiple switch boards, subscribers' talking circuits, test terminals on each of said boards, for each circuit, a circuit connection from each talking circuit, permanently connected with its test terminals, in combination with test battery to one side of which a circuit is connected whenever and as long as switched and connected in closed circuit for conversation, but to the other side of which the circuit is not connected except when a test plug is connected to the line for testing and test receiving instruments, one at each board, each connected on one side to the other side of said test battery whenever the circuit is tested and is thus switched for conversation, and on the other side to a test plug or device adapted to be brought into connection with said test terminal at its board, substantially as set forth.

12. In a telephone exchange system, a metallic circuit-line, a switch for said line containing two contact-pieces to which the two sides or branches of the line are respectively connected, and a loop-plug, with the two conductors of its double conducting cord connected to its two contact-pieces, respectively, said plug being adapted to be inserted into said switch, and when inserted to connect its two contact-pieces with the two contact-pieces of the switch, in combination with a test-receiving instrument connected on one side to one of the conductors of said double cord and on the other side to a switch-testing device adapted to be brought into connection with a contact-piece of the line, and a battery in the circuit between the switch-testing device and the contact-piece of the plug connected therewith, substantially as set forth.

13. In a telephone exchange system, metallic circuit lines, multiple switch boards for said lines, switches for said lines, one switch on each board, each switch containing two contact pieces, to which the two sides or branches of the line are respectively connected, and pairs of loop-plugs at each board, each plug being adapted to be inserted into any switch, and when inserted to connect its two contact-pieces with the two contact-pieces of the switch, respectively, the two contact pieces of one plug being connected with the contact-pieces of its mate, respectively, by two conductors with flexible ends, in combination with test-receiving instruments, one at each board, each instrument being connected on one side to one of the conductors connecting each pair of cords and on its other side to a switch testing device, adapted at the will of the operator to connect it to any line for testing, and a battery in the test-circuit thus established, substantially as set forth.

14. In a telephone exchange system, two subscribers' lines connected together for conversation, their combined circuit being then or as long as they are thus switched for conversation connected with one side of a test battery, but not with the other side of said battery, except when a plug is applied to the circuit for testing in combination with a test receiving instrument connected on one side to the last mentioned side of said battery and on its other side to a test plug adapted to be brought for testing into connection with either line.

In witness whereof I have hereunto subscribed my name.

MILO G. KELLOGG.

Witnesses:
A. C. OWEN,
FRANCES D. KELLOGG.